W. R. AND R. O. KILPATRICK.
NUT LOCK.
APPLICATION FILED SEPT. 5, 1919.
1,333,495.
Patented Mar. 9, 1920.
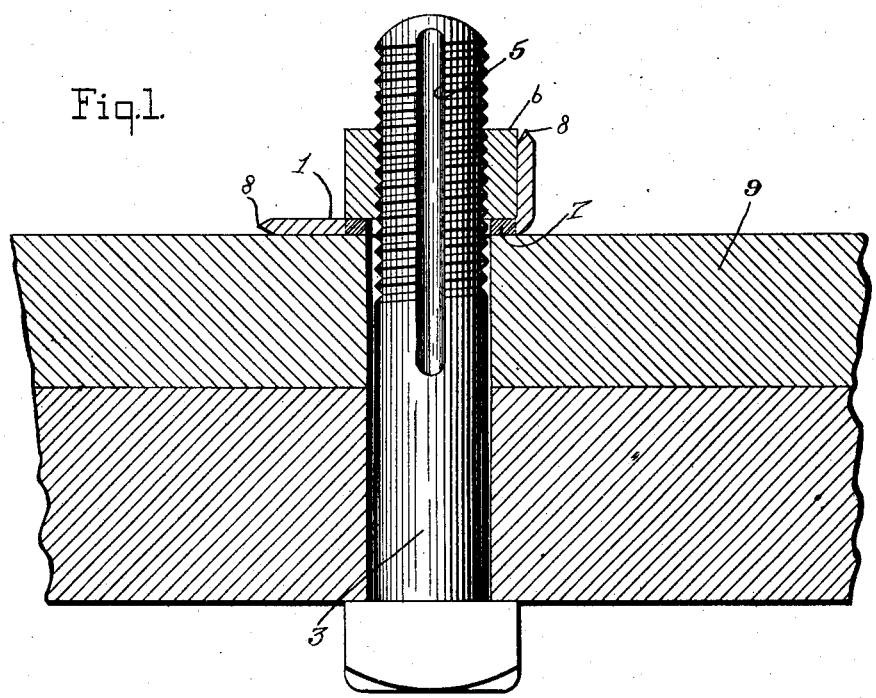
Fig.1.
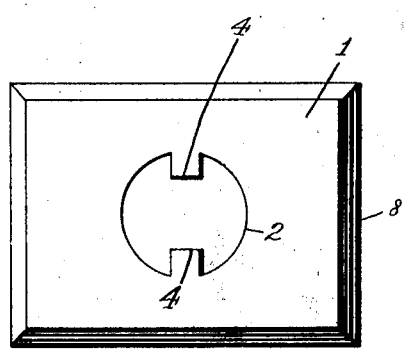
Fig.2.
Fig.3.
WITNESSES
INVENTOR
W.L. Kilpatrick.
R.O. Kilpatrick
BY
ATTORNEYS

UNITED STATES PATENT OFFICE.

WILLIAM R. KILPATRICK AND RALPH O. KILPATRICK, OF BOISE, IDAHO.

NUT-LOCK.

1,333,495.  Specification of Letters Patent.  Patented Mar. 9, 1920.

Application filed September 5, 1919. Serial No. 321,769.

*To all whom it may concern:*

Be it known that we, WILLIAM R. KILPATRICK and RALPH O. KILPATRICK, citizens of the United States, and residents of Boise, in the county of Ada and State of Idaho, have invented certain new and useful Improvements in Nut-Locks, of which the following is a specification.

Our invention is an improvement in nut locks, and has for its object to provide a new and improved lock of the character specified which will lock the nut in any position of angularity with respect to the bolt, never requiring that the nut be turned too tightly or too loosely to bring it in proper position for the lock to function.

In the drawings:

Figure 1 is a sectional view showing the lock in use;

Fig. 2 is a plan view of the lock;

Fig. 3 is an edge view.

In the present embodiment of the invention the lock 1 is in the form of a plate of metal of suitable weight having a central opening 2 through which the body of the bolt 3 may pass. This opening has one or more inwardly extending projections 4, two in the present instance, diametrically opposite each other, and the bolt has longitudinally extending grooves 5 which these tongues or lugs 4 are adapted to fit, and in which they are adapted to move. The plate of the lock 1 is of greater length than the nut 6, as clearly shown in Fig. 4, and the central portion of the lock, preferably over an area corresponding to that of a face of the nut, is hardened, as indicated at 7, the remainder of the plate being unhardened and soft. This is for the purpose of permitting that portion of the plate extending beyond the nut to be bent up against a side face of the nut as shown, in Fig. 1, to lock the nut after the nut has been screwed home.

Referring to Figs. 1 and 3, especially, it will be seen that the edges of the plate are beveled, as shown at 8, to facilitate the engagement of a tool beneath the same to turn up the extended edge of the plate. Any form of tool may be used, as, for instance, a crowbar, cold chisel or even a hammer claw.

In use, the locks are placed on the bolts with the lugs 4 engaging grooves 5. The nut is now turned home, the plate 1 being clamped between the nut and the object 9 through which the bolt is passed. After the nut has been screwed home the extended edge of the lock at one end or at both ends, if desired, is turned up, as shown in Fig. 1, against a side face of the nut, thus firmly locking the nut against accidental displacement. If the face of the nut is not square across the plate it does not matter since the corner of the plate may be turned up as easily as an entire end.

The hardening of the central portion of the plate provides for lugs of strength such that they will not strip during the turning of the nut tightly home, while the hardening of the central portion does not interfere with the turning up of the ends of the plate. If the entire plate were hardened it would be difficult to turn up the ends, while if the entire plate were soft the lugs 4 would not be strong enough to serve their function properly. The beveled edges 8 permit any kind of a tool to be engaged beneath the plate to turn up the same.

We claim:

1. In combination, a bolt having a pair of diametrically arranged longitudinally extending grooves at the threaded portion thereof, a rectangular plate for locking the nut, said plate having a circular opening for the passage of the bolt and having a pair of oppositely disposed lugs formed thereon extending into the opening for engagement within the grooves in the bolt, said plate being of a size that the edges thereof will extend beyond a nut engaged upon the bolt, the portion of the plate projecting beyond the nut when the nut is in any position being capable of being turned up into engagement with a flat face of the nut whereby to prevent retrograde movement of the nut, and the central portion of the plate being hardened and the outer portion thereof being left soft whereby the central portion will constitute a guide for insuring the turning up of only the outer portion.

2. In combination with a bolt and the nut threaded thereon, a lug comprising a rectangular plate engaged upon the bolt and prevented from rotary movement with respect thereto and interposed between the nut and the structure through which the bolt extends, said plate being capable of being struck up into engagement with a flat side of the nut whereby to prevent retrograde rotation of the nut, the edges of said plate at both sides thereof being beveled whereby to facilitate the insertion of a tool between the plate and the structure through which the bolt extends for permitting the portion of the plate extending beyond the nut to be struck up into engagement with the nut or to permit the upstruck portion in engagement with a nut to be forced into engagement with the structure through which the bolt passes whereby retrograde rotation of the nut may be permitted.

WILLIAM R. KILPATRICK.
RALPH O. KILPATRICK.